No. 747,450. PATENTED DEC. 22, 1903.
W. A. LORENZ.
HERMETICALLY SEALED JAR.
APPLICATION FILED DEC. 2, 1901.
NO MODEL.
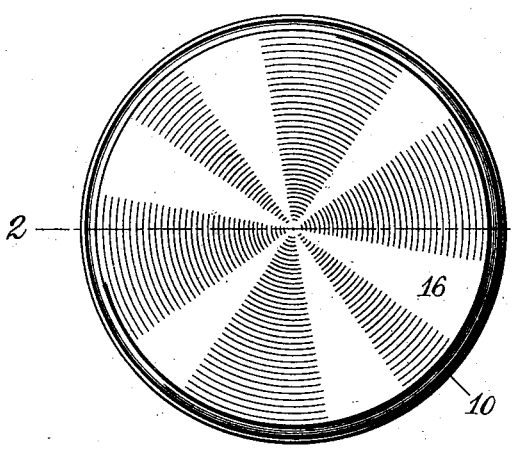
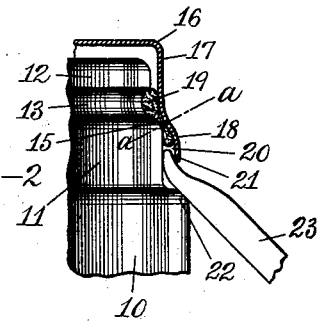
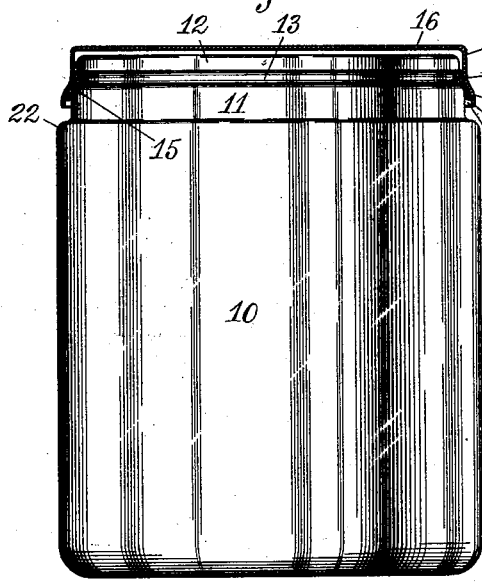
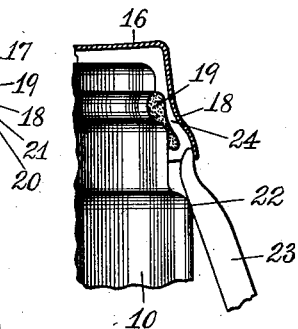
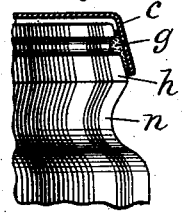
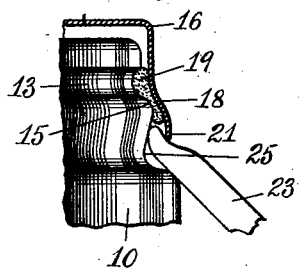
Witnesses:
H. Mallner
Joseph Merritt
Inventor
William A. Lorenz
By Wm H Honiss Att'y.

No. 747,450. Patented December 22, 1903.

UNITED STATES PATENT OFFICE.

WILLIAM A. LORENZ, OF HARTFORD, CONNECTICUT, ASSIGNOR OF THREE-FOURTHS TO BEECH-NUT PACKING COMPANY, OF CANAJOHARIE, NEW YORK, A CORPORATION OF NEW YORK, AND WILLIAM H. HONISS, OF HARTFORD, CONNECTICUT.

HERMETICALLY-SEALED JAR.

SPECIFICATION forming part of Letters Patent No. 747,450, dated December 22, 1903.

Application filed December 2, 1901. Serial No. 84,325. (No model.)

*To all whom it may concern:*

Be it known that I, WILLIAM A. LORENZ, a citizen of the United States of America, and a resident of Hartford, in the county of Hartford and State of Connecticut, have invented certain new and useful Improvements in Hermetically-Sealed Jars, of which the following is a specification.

This invention relates to improvements in hermetically-sealed cans or jars of the class most commonly employed for the exclusion of air from foods and other materials.

My preferred embodiment of this invention is shown in the first four figures of the drawings, in which similar characters denote similar parts.

Figure 1 is a plan view. Fig. 2 is a side view in which the cap and gasket are shown in section taken on the line 2 2 of Fig. 1 in their closed or sealed position. Fig. 3 is an enlarged portion of the jar, cap, and gasket of Fig. 2, showing a tool inserted in position preparatory to opening the jar. Fig. 4 is a similar view showing the flexible rim of the cap sprung away from the gasket by the tool to admit the air. Fig. 5 shows a modified contour of the neck of the jar. Fig. 6 is a fragmentary view of a jar and cap of the prior art.

Jars of this class are, as shown in Fig. 6, commonly provided with a reduced neck $n$, surmounted by an upwardly-converging head $h$, provided with a groove for receiving the gasket $g$, which is flattened by means of a flexible metallic cap $c$, the rim of which is flared in substantial accordance with the upwardly-converging head of the jar. When the cap is forced down to seal such a jar, the gasket is flattened out in the joint between the comparatively wide parallel zones of the rim and jar, presenting a wide annular surface for taking the pressure, which is therefore distributed over that surface. Inasmuch as the pressure upon any given surface is reduced in inverse ratio to the extent of the entire supporting area when the sealing pressure is thus distributed over a comparatively wide annular surface, the chances of making a continuous air-excluding joint entirely around the jar are correspondingly reduced. Furthermore, in the common construction of the jar and cap shown in Fig. 6 the edge of the cap is exposed and is liable to cut or scratch the hands of the packer, as well as the purchaser of the jar. These caps are commonly struck up by dies from flat sheet-metal blanks, and in the drawing operation the edges are considerably thinned and may be so irregular as to present objectionably sharp edges. In my present invention these objections are overcome by providing a comparatively narrow and rounded zone, against which the gasket is compressed in the sealing operation, a free space being left below the rounded zone into which the rubber is readily forced wherever any inequalities exist in the thickness of the rubber gasket or in the contour of the sealing zone. I also provide a projecting shoulder immediately below the edge of the cap, which shoulder is somewhat larger in diameter than the cap, and thus forms a protecting-surface for that edge entirely around its perimeter. Furthermore, I thereby provide ready means for opening the jar, the shoulder being located far enough below the edge of the cap-rim to permit the introduction of a tool, as shown in Fig. 3, by means of which the cap may be sprung away at one side, as shown in Fig. 4, to permit the entrance of air, and thus break the atmospheric seal, so that the jar-cap can readily be removed.

The upper or mouth portion of the jar 10 is formed with two narrow annular bands or rings 11 and 12, separated by a gasket-groove 13. The band 12 is made smaller in diameter than the band 11. The annular portion 11 is made substantially cylindrical in the jar, as shown in Figs. 2, 3, and 4, the upper portion thereof merging into the gasket-groove 13 by means of a substantially rounded shoulder 15.

The gasket 19 is retained in place prior to the sealing operation by any convenient seat, as by the groove 13, which, in combination with the rounded shoulder 15, forms a seat for that gasket after compression, as shown in Figs. 2 and 3. The flexible metallic cap 16 is provided with a rim having a substantially vertical portion 17 and a flaring portion 18. When the atmospheric pressure takes effect upon the cap 16, the greater portion of that pressure is borne by the rounded shoulder 15, thereby compressing the gasket around a comparatively narrow zone at $a\ a$ much more than it is compressed elsewhere, inasmuch as the contour of the shoulder 15 diverges from that of the cap both above and below that zone. Below that shoulder the contour of the jar departs from that of the cap sufficiently to form an opening 20 for the introduction of a tool 23 between the edge 21 of the cap-rim and the peripheral shoulder 22, which forms a fulcrum for the action of the tool, as shown in Fig. 4. That shoulder projects beyond the peripheral edge of the cap-rim far enough to protect the latter from being bent or jammed during transportation and also protects the hands of the packers and other handlers of the jars from being cut by the sharp edges of the rim.

In the operation of sealing the jar the air is exhausted from the interior, and the cap 16 is pressed down upon the gasket 19 and operates first to flatten out that gasket into a band which extends above and below the shoulder 15 and then to compress or pinch it against a narrow annular zone, (indicated by $a\ a$,) thereby making a tighter and more secure and reliable joint than if the pressure were distributed over a wider zone. Furthermore, the continued atmospheric pressure upon the cap which is now usually relied on to maintain the seal will when thus concentrated upon a narrow zone more surely maintain a tight joint as the gasket shrinks or sets or hardens than if that pressure were distributed over a wider zone.

In the operation of unsealing the flexible cap 16 the point of the tool 23 is inserted in the opening 20 below the rim 21 of the cap and is fulcrumed on the shoulder 22 of the jar. By prying with the point of the tool, as shown in Fig. 4, the rim 18 will be sprung outwardly at a point close to the gasket, forming a passage 24 for the readmission of air into the interior of the jar, after which the cap may be readily removed. The cap 16 being flexible, it is only necessary to spring a small portion of the rim of the cap away from the gasket, and this is readily done in the manner described by means of a small tool or knife, although the atmospheric pressure upon the whole cap may be too great to allow of removing the cap bodily from the jar.

In Fig. 5 the contour of the band 25 below the gasket-groove forms a larger opening for the insertion of the tool than in the previous figures. The particular form or contour of this portion of the jar is immaterial.

In opening jars of this class it is customary to break the atmospheric seal either by puncturing the cap or by thrusting a knife or other sharp instrument up between the rim of the cap and the side of the jar, thereby cutting the gasket; but in unsealing caps in the manner herein described it is unnecessary to puncture them or to cut the gaskets, thereby preserving all the parts intact for subsequent use.

I claim as my invention—

1. The combination, with a gasket and with a cap having a flaring rim for sealing the gasket, of a jar provided with a sealing-seat for the gasket, comprising a rounded shoulder coöperating with the cap for establishing the principal sealing pressure upon the gasket at a single narrow zone between the upper and lower edges thereof.

2. The combination, with a gasket and with a cap having a flaring rim for sealing the gasket, of a jar provided with a sealing-seat for the gasket, comprising a rounded shoulder coöperating with the cap for establishing the principal sealing pressure upon the gasket at a single narrow zone between the upper and lower edges thereof, the contour of the cap and jar diverging from each other above and below the said narrow zone to reduce the pressure each way from that zone toward the edges of the gasket.

WILLIAM A. LORENZ.

Witnesses:
JOSEPH MERRITT,
NELLIE PHOENIX.